No. 849,659. PATENTED APR. 9, 1907.
J. P. COOPER.
STALK CUTTER.
APPLICATION FILED DEC. 7, 1906.
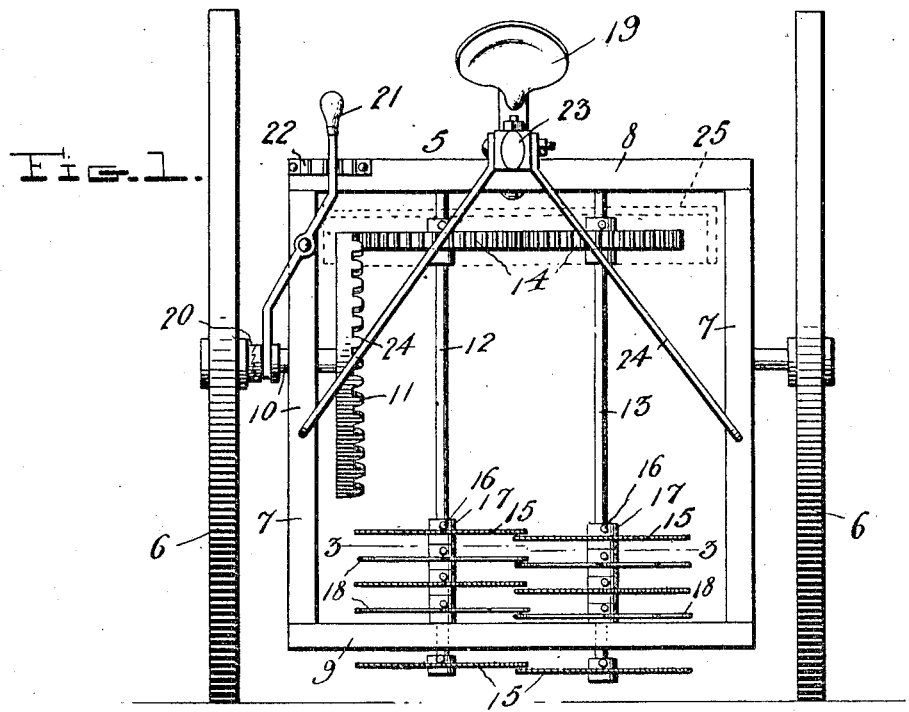
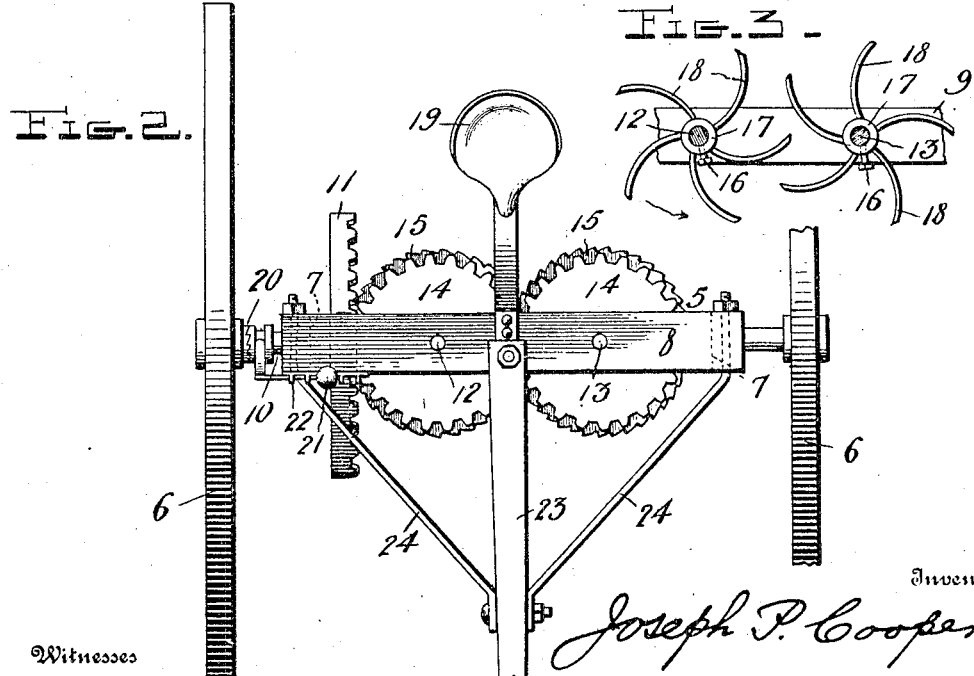
Witnesses
Inventor
Joseph P. Cooper
Attorneys

UNITED STATES PATENT OFFICE.

JOSEPH P. COOPER, OF FARMERSVILLE, TEXAS.

STALK-CUTTER.

No. 849,659.　　　Specification of Letters Patent.　　　Patented April 9, 1907.

Application filed December 7, 1906. Serial No. 346,751.

*To all whom it may concern:*

Be it known that I, JOSEPH P. COOPER, a citizen of the United States, residing at Farmersville, in the county of Collin and State of Texas, have invented new and useful Improvements in Stalk-Cutters, of which the following is a specification.

This invention is a stalk-cutter, and has for its object to provide a machine of this kind which will cut the stalks into a number of pieces, so that they can be plowed under, thereby enriching the soil and leaving the field clean.

A further object is to provide a stalk-cutter embodying simplicity of construction and also one which is of light draft.

In the accompanying drawings, Figure 1 is a front elevation of the machine. Fig. 2 is a plan view. Fig. 3 is a horizontal section on the line 3 3 of Fig. 1.

Referring specifically to the drawings, 5 denotes a rectangular frame which is mounted on wheels 6. The frame comprises side bars 7 and top and bottom bars 8 and 9, respectively. The axle 10 of one of the wheels extends loosely through one of the side bars 7 and inside the frame is fitted with a gear-wheel 11. In the bars 8 and 9 are journaled parallel and vertically-extending shafts 12 and 13, respectively, provided with meshing gears 14, one of which meshes with the drive-gear 11.

On each shaft 12 and 13 is secured a series of disks 15, having serrated cutting edges. The disks are adjustable up and down on the shaft, they being secured by set-screws 16, extending through the hubs 17 of the disks. Upon loosening the set-screws the cutting-disks can be adjusted on the shafts according to the height of the stalks to be cut. The cutting-disks are arranged in pairs, with the cutting edges of each pair overlapping, as shown. In the drawings I have shown each shaft 12 and 13 provided with three cutting-disks, but more or less of such disks may be used, this depending on the height and character of the stalks to be cut. One pair of cutting-disks is below the bottom bar 9, and the others are located above said bar. The shafts 12 and 13 also carry radially-extending arms 18, which are for the purpose of gathering the stalks and carrying them against the cutting-disks. These arms are located between the cutting-disks which are above the bottom bar 9, and they are also adjustable on the shafts in the same manner as the cutting-disks.

The machine is provided with a seat 19, which is secured to the top bar 8. A suitable clutch mechanism 20 for throwing the machine into and out of gear is also provided. The operating-lever 21 of the clutch is fulcrumed on the frame 5, and a rack 22 is provided for holding the lever in adjusted position. The draft-tongue 23 is secured to the top bar 8 and has stay-rods 24, which extend to and are made fast to the side bars 7. The gears can be inclosed in a housing, as indicated by dotted lines at 25.

The machine herein described is light and simple in construction and at the same time strong and durable. It will cut green and dead stalks on wet or dry ground. The stalks will be thoroughly cut up and crushed into small pieces, so that they can be left on the ground to be plowed under, thereby enriching the soil and leaving the field clear for the next crop.

I claim—

1. A stalk-cutter comprising a wheeled frame, a pair of wheel-driven vertical shafts journaled in the frame, a series of cutters mounted on each shaft, and radially-extending gatherer-arms on the shafts between the cutters.

2. A stalk-cutter comprising a wheeled frame, a pair of wheel-driven vertical shafts journaled in the frame, a series of cutters mounted on each shaft and adjustable up and down thereon, and radially-extending gatherer-arms on the shafts between the cutters.

3. A stalk-cutter comprising a wheeled frame, a drive-gear on the axle of one of the wheels, a pair of vertical shafts journaled in the frame, meshing gears on the shafts one of said gears meshing with the drive-gear, a series of cutters on each shaft, and radially-extending gatherer-arms on the shafts between the cutters.

In testimony whereof I have signed my name to this specification in the presence of two subscribing witnesses.

JOSEPH P. COOPER.

Witnesses:
　R. W. HUDSON,
　R. E. HUDSON.